United States Patent
Nagata et al.

(10) Patent No.: US 10,289,316 B2
(45) Date of Patent: May 14, 2019

(54) STORAGE MANAGEMENT DEVICE, PERFORMANCE ADJUSTMENT METHOD, AND COMPUTER-READABLE RECORDING MEDIUM

(71) Applicant: FUJITSU LIMITED, Kawasaki-shi, Kanagawa (JP)

(72) Inventors: Takeshi Nagata, Yokohama (JP); Yuto Kojima, Yamato (JP); Osamu Nagashima, Numazu (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/684,981

(22) Filed: Aug. 24, 2017

(65) Prior Publication Data
US 2018/0067659 A1    Mar. 8, 2018

(30) Foreign Application Priority Data
Sep. 7, 2016    (JP) .................... 2016-175058

(51) Int. Cl.
| | | |
|---|---|---|
| G06F 12/00 | (2006.01) | |
| G06F 13/00 | (2006.01) | |
| G06F 13/28 | (2006.01) | |
| G06F 3/06 | (2006.01) | |
| G06F 9/50 | (2006.01) | |

(52) U.S. Cl.
CPC .......... *G06F 3/0613* (2013.01); *G06F 3/0611* (2013.01); *G06F 3/0631* (2013.01); *G06F 3/0683* (2013.01); *G06F 3/061* (2013.01); *G06F 9/5083* (2013.01)

(58) Field of Classification Search
USPC ........................................... 711/170
See application file for complete search history.

(56) References Cited

U.S. PATENT DOCUMENTS

| | | | |
|---|---|---|---|
| 2003/0046396 A1 * | 3/2003 | Richter ................ | G06F 9/505 709/226 |
| 2006/0080457 A1 | 4/2006 | Hiramatsu et al. | |
| 2013/0262649 A1 | 10/2013 | Shimmitsu et al. | |
| 2015/0281357 A1 | 10/2015 | Makida et al. | |
| 2016/0188246 A1 * | 6/2016 | Makida ................ | G06F 3/061 711/158 |

FOREIGN PATENT DOCUMENTS

| | | |
|---|---|---|
| JP | 2006-067401 | 3/2006 |
| JP | 2013-057996 | 3/2013 |
| JP | 2013-206229 | 10/2013 |
| JP | 2015-191324 | 11/2015 |

* cited by examiner

*Primary Examiner* — Edward J Dudek, Jr.
*Assistant Examiner* — Sidney Li
(74) *Attorney, Agent, or Firm* — Fujitsu Patent Center

(57) ABSTRACT

A monitoring unit obtains the performance information of each of a plurality of volumes included in a storage device. A setting unit obtains a performance target value for each of one or more targeted volumes from among the plurality of volumes. Based on the performance information obtained by the monitoring unit and based on a first-type standby time that is attributed to bandwidth limitation of IO requests with respect to the targeted volumes which are obtained by the setting unit and which achieve the performance target value, a bandwidth managing unit obtains the bandwidth for the targeted volumes that achieve the performance target value and performs bandwidth limitation to change the bandwidth of the targeted volumes to the obtained bandwidth.

9 Claims, 10 Drawing Sheets

STORAGE MANAGEMENT DEVICE, PERFORMANCE ADJUSTMENT METHOD, AND COMPUTER-READABLE RECORDING MEDIUM

CROSS-REFERENCE TO RELATED APPLICATION

This application is based upon and claims the benefit of priority of the prior Japanese Patent Application No. 2016-175058, filed on Sep. 7, 2016, the entire contents of which are incorporated herein by reference.

FIELD

The embodiments discussed herein are related to a storage management device, a performance adjustment method, and a computer-readable recording medium.

BACKGROUND

In recent years, open systems and virtualization of servers has become popular, and the management of system has become more complex. Hence, from the perspective of achieving easiness in managing systems and having flexibility toward the rapidly increasing data volume, it is becoming common practice to implement storage systems.

In a storage system, the performance of the storage system is adjusted by adjusting the bandwidth limitation of the data transfer paths provided among volumes and a server that executes applications. As a specific example of bandwidth limitation, the bandwidth is automatically assigned according to the priority of the tasks. In that case, for example, an upper limit of the bandwidth is decided for the tasks having low priority, and the bandwidth used by the tasks having low priority is adjusted within the range of the upper limit, and the freed bandwidth is used in the tasks having high priority.

Conventionally, regarding the adjustment of the bandwidth limitation, a target value is specified using a response time that serves as an easy-to-specify value for the user, and the storage system adjusts the bandwidth in such a way that the response time of the targeted task satisfies the specified target value.

As a performance adjustment technology in such an information processing system, in order to achieve the target performance, a conventional technology is known for calculating the processing time excluding the standby time required for locking the database records. Moreover, a conventional technology is known for varying the performance target value on an application-by-application basis. Furthermore, a conventional technology is known for performing priority control of the accesses according to the level of the service provided by a virtual machine. Moreover, a conventional technology is known for deciding the priority of an access request based on the attribute of the client issuing the access request.

Patent Document 1: Japanese Laid-open Patent Publication No. 2013-57996
Patent Document 2: Japanese Laid-open Patent Publication No. 2015-191324
Patent Document 3: Japanese Laid-open Patent Publication No. 2013-206229
Patent Document 4: Japanese Laid-open Patent Publication No. 2006-67401

However, in the conventional bandwidth adjustment, the actually-measured response time and the target response time is compared, and the bandwidth is accordingly varied in a stepwise manner so as to approach the bandwidth at which the target response time is achieved. Since the bandwidth is adjusted in a stepwise manner, it takes time to reach the appropriate bandwidth, thereby making it difficult to follow unexpected or rapid changes in the input-output (IO).

Moreover, in the conventional technology of calculating the processing time excluding the standby time required for locking or in the conventional technology of varying the performance target value on an application-by-application basis, since the change in performance occurs in a stepwise manner, adjusting the bandwidth takes time. The same is the case in the conventional technology of performing priority control of the accesses according to the service level or in the conventional technology of deciding the priority based on the attribute of the client. Thus, it is a difficult task to adjust the bandwidth in an expeditious manner.

SUMMARY

According to an aspect of an embodiment, a storage management device includes: a processor configured to: obtain performance information of each of a plurality of volumes included in a storage device; obtain a performance target value for each of one or more targeted volumes from among the plurality of volumes; and obtain, based on the performance information obtained and based on a first-type standby time that is attributed to bandwidth limitation of IO requests with respect to the targeted volumes which are obtained and which achieve the performance target value, bandwidth for the targeted volumes that achieve the performance target value and performs bandwidth limitation to change bandwidth of the targeted volumes to the obtained bandwidth.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Preferred embodiments of the present invention will be explained with reference to accompanying drawings. However, the storage device, the performance adjustment method, and the computer-readable recording medium disclosed herein are not limited to the embodiments described below.

[a] First Embodiment

Figure 1:
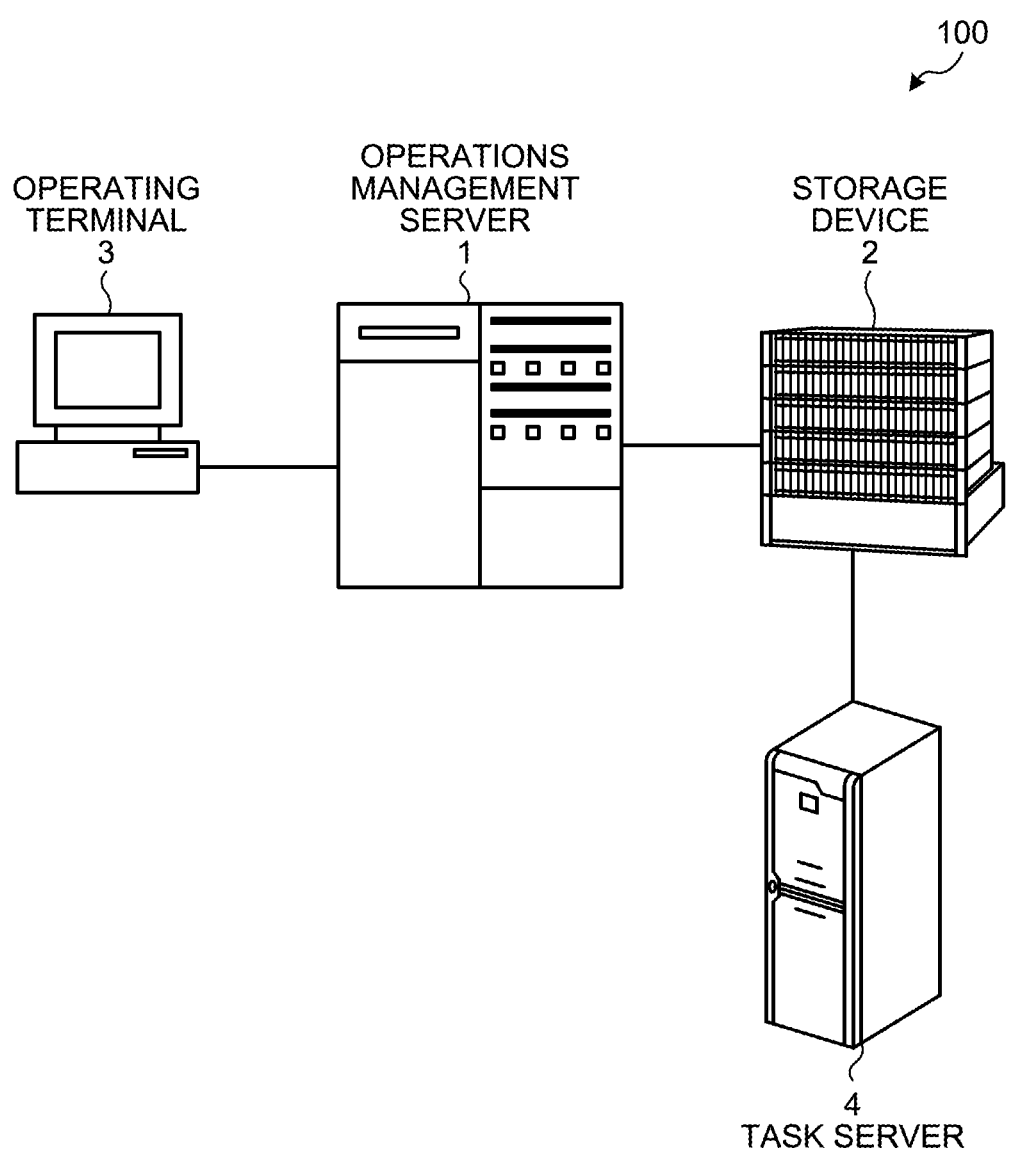
FIG. 1 is an overall configuration diagram of a storage system.

FIG. 1 is an overall configuration diagram of a storage system. As illustrated in FIG. 1, a storage system 100 according to a first embodiment includes an operations management server 1, a storage device 2, an operating terminal 3, and a task server 4. In FIG. 1, although only a single storage device 2 is illustrated, there is no restriction on the number of storage devices 2. Moreover, although only a single task server 4 is illustrated, there is no restriction on the number of task servers 4.

The operating terminal 3 is connected to the operations management server 1 via a network. The operating terminal 3 sends, to the operations management server 1, instructions about the operations to be performed with respect to the storage device 2. Moreover, the operating terminal 3 displays messages, which are sent from the operations management server 1, on a monitor as notifications to the operator.

The operations management server 1 operates and manages the storage device 2. The operations management server 1 executes a Quality of Service (QoS) control program and a storage management program. Herein, the operations management server 1 represents an example of a "storage management device".

More particularly, the operations management server 1 performs QoS control in the storage device 2. Herein, the QoS represents a performance setting function meant for enabling the storage device 2 to maintain a stable performance, and includes adjustment of volume bandwidth (described later). Moreover, the operations management server 1 controls the storage device 2 according to the instructions input from the operating terminal 3. For example, the operations management server 1 instructs the storage device 2 to configure a redundant array of independent disks (RAID) according to an input from the operating terminal 3.

The storage device 2 receives an instruction from an application running in the task server 4, and performs data reading or data writing by applying the QoS. Moreover, the storage device 2 receives an instruction for volume bandwidth adjustment from the operations management server 1, and performs QoS control.

The task server 4 executes task applications and provides one or more task services. Every time an application is executed, the task server 4 reads data from or writes data into the storage device 2. As long as the applications executed by the task server 4 are applications for communicating data with the storage device 2, there is no particular restriction on the applications.

Figure 2:
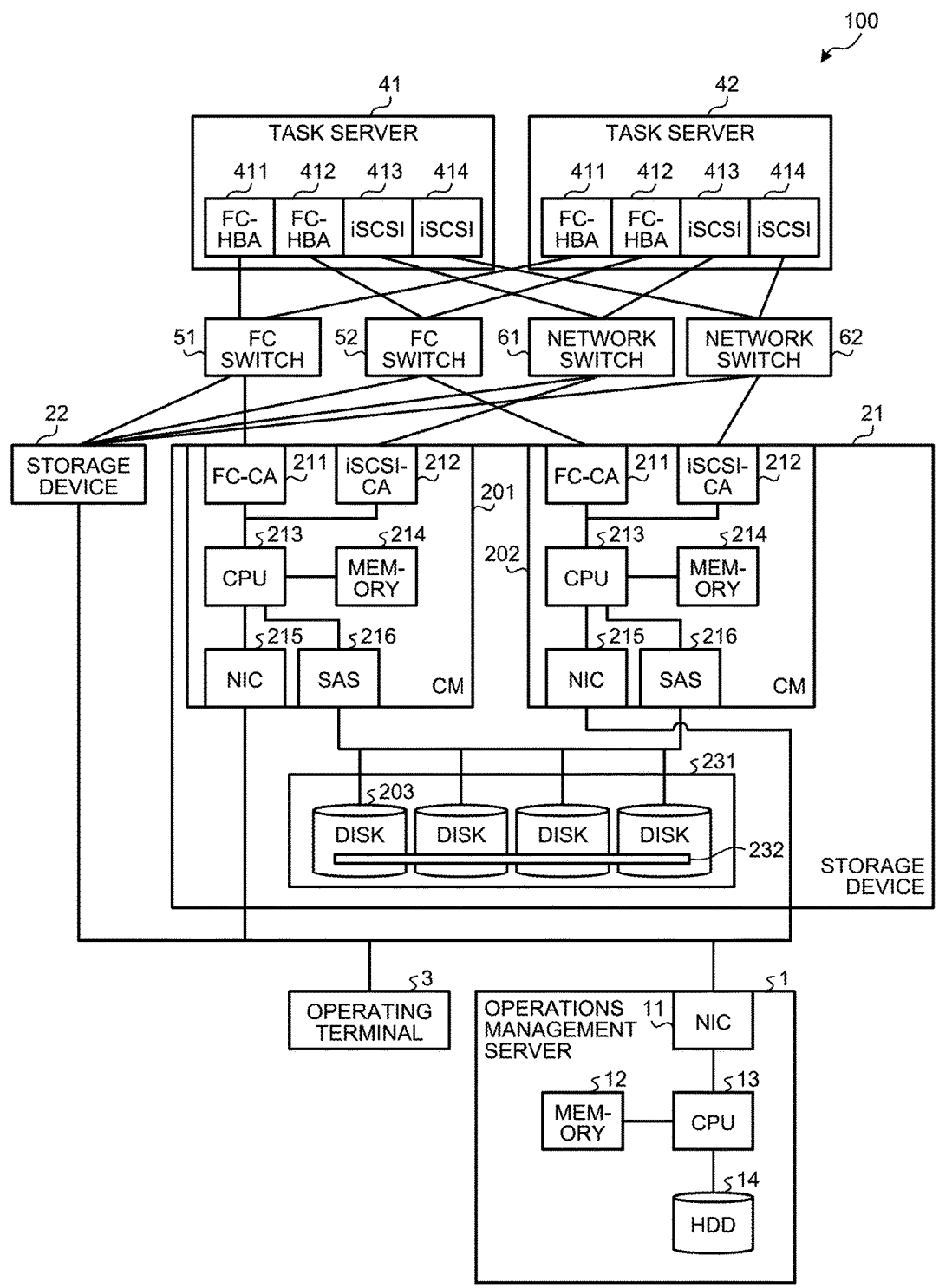
FIG. 2 is a hardware configuration diagram of the storage system.

FIG. 2 is a hardware configuration diagram of the storage system. In FIG. 2, it is illustrated that storage devices 21 and 22 are disposed as the storage devices 2. Moreover, it is illustrated that task servers 41 and 42 are disposed as the task server 4.

The task servers 41 and 42 have the same configuration. Hence, in the case of not distinguishing therebetween, the task servers 41 and 42 are referred to as the "task servers 4". Similarly, the storage devices 21 and 22 have the same configuration. Hence, in the case of not distinguishing therebetween, the storage devices 21 and 22 are referred to as the "storage devices 2".

Each task server 4 includes FC-HBAs 411 and 412 (FC-HBA stands for Fiber Channel-Host Bus Adapter) and includes iSCSIs 413 and 414 (iSCSI stands for Internet Small Computer System Interface). In the first embodiment, although two FC-HBAs 411 and 412 are illustrated, the task server 4 can include an arbitrary number of FC-HBAs. Similarly, although two iSCSIs 413 and 414 are illustrated, the task server 4 can include an arbitrary number of iSCSIs.

The FC-HBAs 411 and 412 are communication interfaces for performing data communication using fiber channels. The FC-HBAs 411 and 412 are respectively connected to FC switches 51 and 52.

The iSCSIs 413 and 414 are communication interfaces for performing data communication based on the iSCSI standard. The iSCSIs 413 and 414 are respectively connected to network switches 61 and 62.

The FC switches 51 and 52 relay the communication performed between the storage devices 2 and the task servers 4 using fiber channels. Moreover, the FC switches 51 and 52 connect the HC-HBAs 411 and 412, respectively, to FC-CAs 211 (CA stands for Channel Adapter).

The network switches 61 and 62 relay the communication performed using the storage devices 2 and the task servers 4 using the iSCSIs 413 and 414. Moreover, the network switches 61 and 62 connect the iSCSIs 413 and 414, respectively, to iSCSI-CAs 212.

Each storage device 2 includes controller modules (CMs) 201 and 202, and includes disks 203.

The CMs 201 and 202 have identical functions. The following explanation is given with reference to the CM 201.

The CM 201 includes the FC-CA 211, the iSCSI-CA 212, a central processing unit (CPU) 213, a memory 214, a network interface card (NIC) 215, and a serial attached SCSI (SAS) 216.

The FC-CA 211, the iSCSI-CA 212, the memory 214, the NIC 215, and the SAS 216 are connected to the CPU 213.

The CPU 213 performs communication of data with the task servers 4 via the FC-CA 211 and the iSCSI-CA 212.

Moreover, the CPU 213 reads data from and writes data into the disks 203 via the SAS 216.

Furthermore, the CPU 213 performs communication between the operating terminal 3 and the operations management server 1 via the NIC 215. For example, when an instruction for bandwidth adjustment (described later) is received from the operations management server 1, the CPU 213 adjusts the bandwidth of the disks 203 according to the instruction.

The storage device 2 has a plurality of disks 203 installed therein. With reference to FIG. 2, a plurality of disks 203 constitute a RAID group 231. However, the configuration is not limited to the example given in the first embodiment. Alternatively, the disks 203 need not constitute a RAID group. Herein, some memory area of the RAID group 231 is assigned to the memory area of volumes 232, which are logical volume.

Given below is the explanation of the data reading and the data writing performed by the CPU 213. The CPU 213 receives a read command, which represents an instruction for data reading, or a write command, which represents an instruction for data writing, from a task application running in the task server 4. For example, a read command or a write command is sent to the CPU 213 via, for example, the port of the FC switch 51 and the port of the FC-CA 211.

According to the received command, the CPU 213 reads data from or writes data into the volumes 232 of the disks 203. Herein, the explanation is given for the case in which the CPU 213 of the CM 201 performs data reading and data writing. The CPU 213 of the CM 202 also performs identical operations.

Regarding the data transfer involved in data writing or data reading, there occurs competition among the following: the port of the FC switch 51; the port of the FC-CA 211 or the iSCSI-CA 212; the CPU 213 representing the processor for data processing; and the RAID group 231. In the following explanation, the port of the FC switch 51; the port of the FC-CA 211 or the iSCSI-CA 212; the CPU 213 representing the processor for data processing; and the RAID group 231 are sometimes collectively referred to "resources".

The operations management server 1 includes an NIC 11, a memory 12, a CPU 13, and a hard disk drive (HDD) 14. The NIC 11, the memory 12, and the HDD 14 are connected to the CPU 13 by a bus.

Figure 3:
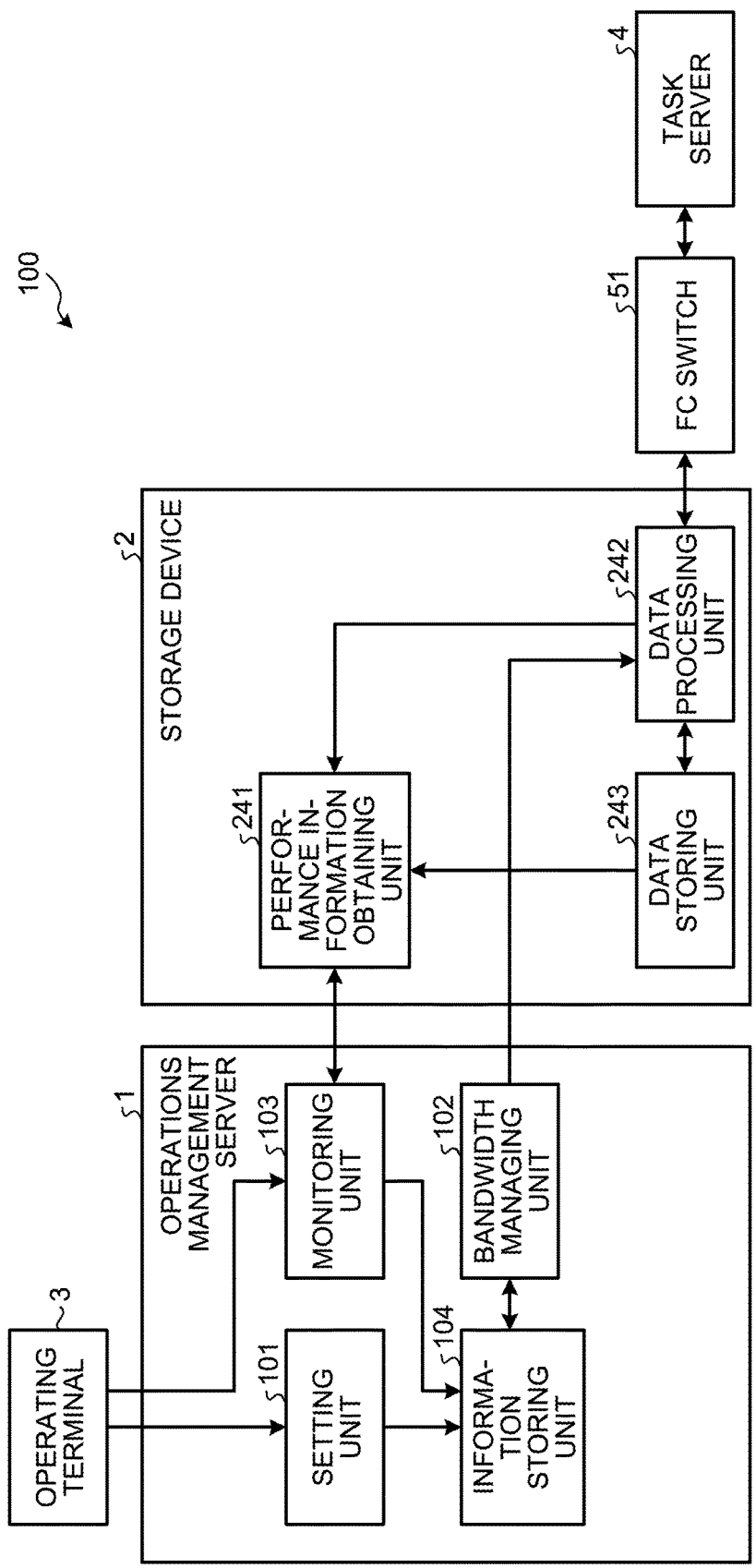
FIG. 3 is a block diagram of an operations management server and a storage device according to a first embodiment.

FIG. 3 is a block diagram of the operations management server and the storage device according to the first embodiment. The operations management server 1 includes a setting unit 101, a bandwidth managing unit 102, a monitoring unit 103, and an information storing unit 104. The storage device 2 includes a performance information obtaining unit 241, a data processing unit 242, and a data storing unit 243.

Given below is the explanation about the storage device 2. The data storing unit 243 includes the disks 203. Moreover, the data storing unit 243 includes the RAID group 231 formed by combining a plurality of disks 203, and further includes the volumes 232 formed in the RAID group 231.

Figure 4:
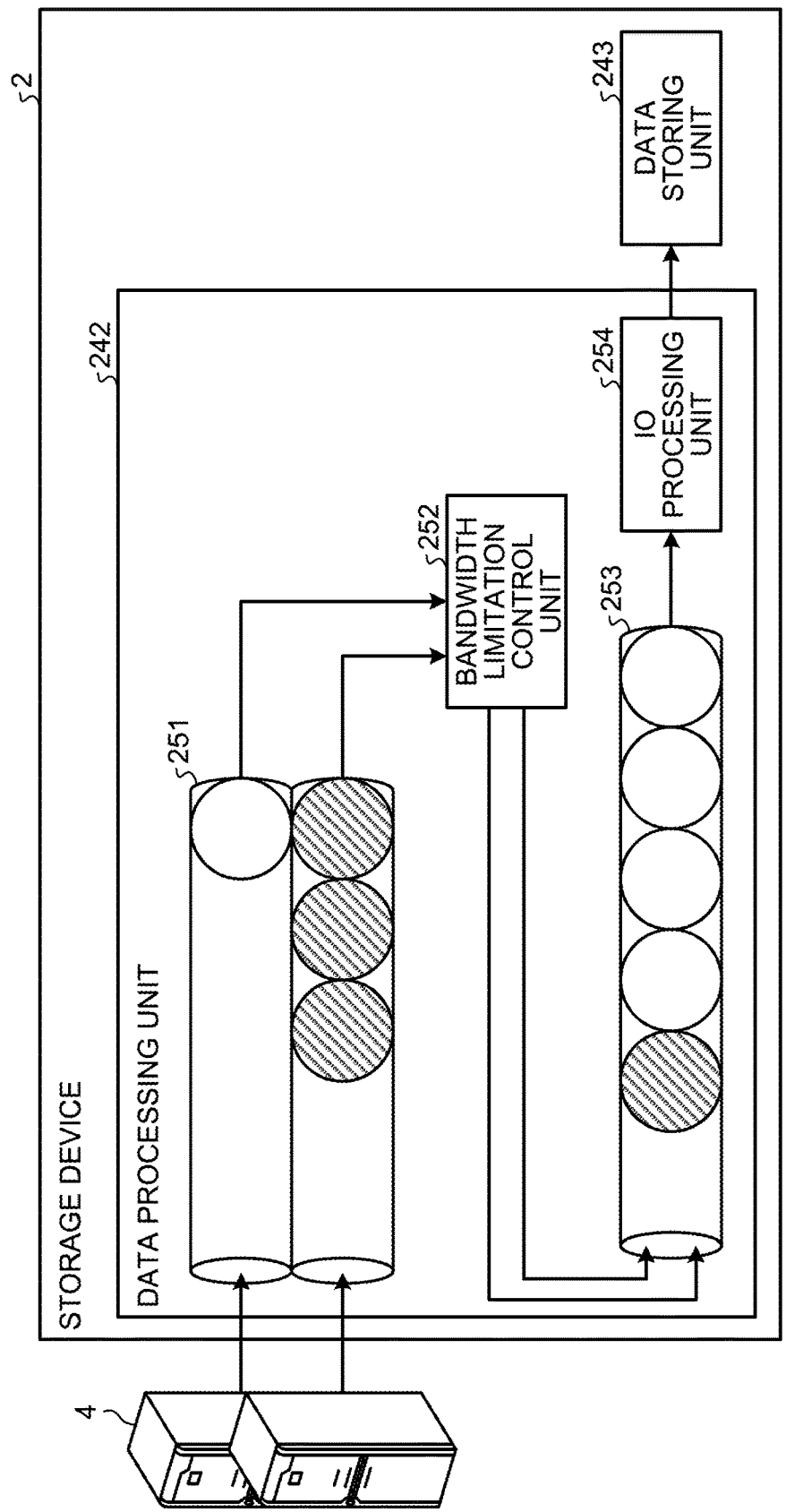
FIG. 4 is a diagram for explaining the response time.

As illustrated in FIG. 4, the data processing unit 242 includes a bandwidth limitation standby queue 251, a bandwidth limitation control unit 252, an IO standby queue 253, and an IO processing unit 254. FIG. 4 is a diagram for explaining the response time. In the following explanation, the volumes 232 included in the data processing unit 242 are simply referred to "volumes 232".

The bandwidth limitation standby queue 251 is a queue for storing, before the bandwidth limitation is performed, IO requests that are received from the task servers 4 with respect to the volumes 232. Herein, once the IO requests are stored in the bandwidth limitation standby queue 251, the period of time until bandwidth limitation is performed by the bandwidth limitation control unit 252 and the IO requests get stored in the IO standby queue 253 is called bandwidth limitation standby time.

The bandwidth limitation control unit 252 receives, from the bandwidth managing unit 102, setting commands for expanding or narrowing the bandwidth. Then, the bandwidth limitation control unit 252 expands or narrows the bandwidth of the volume 232, which is specified in the corresponding setting command, according to the instruction in that setting command.

The IO standby queue 253 is a queue for storing the IO requests until IO processing is performed after the bandwidth limitation has been applied. Once the IO requests are stored in the IO standby queue 253 by the bandwidth limitation control unit 252, the period of time until the IO requests are output to the IO processing unit 254 is called other-IO-processing standby time.

The IO processing unit 254 obtains the IO requests in the order of storage from the IO standby queue 253, and performs operations according to the obtained IO requests. The time taken by the IO processing unit 254 to process the IO requests, which are obtained from the IO standby queue 253, is called IO processing time.

The data storing unit 243 is a memory device used to store the data specified in the IO requests. The data storing unit 243 is implemented using the disks 203 illustrated in FIG. 2.

The performance information obtaining unit 241 receives, from the monitoring unit 103, an instruction to start performance collection. In response, the performance information obtaining unit 241 periodically obtains performance information of each volume 232, and sends the performance information to the monitoring unit 103. Moreover, the performance information obtaining unit 241 periodically obtains performance information such as the other-IO-processing standby time and the IO processing time of the data processing unit 242, and sends the performance information to the monitoring unit 103. For example, the IO count per unit time is calculated separately for reading and for writing by dividing the count within the measurement period by the measurement period. Regarding the response time and the standby time too, the value per instance is calculated separately for reading and for writing by dividing the overall response time by the count.

The functions of the performance information obtaining unit 241 and the data processing unit 242 are implemented using, for example, the controller modules 201 and 202 illustrated in FIG. 2.

Given below is the explanation of the operations management server 1. From the operating terminal 3, the setting unit 101 receives the target value, such as the target response time, that is input by the operator with respect to the volumes 232. Then, the setting unit 101 stores, in the information storing unit 104, the target response time with respect to the specified volumes 232. Herein, the setting unit 101 represents an example of a "target value obtaining unit".

The monitoring unit 103 receives, from the operating terminal 3, an instruction for starting performance collection as issued by the operator. Then, the monitoring unit 103 periodically starts receiving the performance information of the volumes 232 and the performance information of the data processing unit 242 from the performance information obtaining unit 241. Subsequently, the monitoring unit 103 stores the performance information of the volumes 232 and the performance information of the data processing unit 242 in the information storing unit 104. The performance information of the data processing unit 242 contains the period of time for which IO requests are stored on standby in the queue in the data processing unit 242, and contains the actual period of time taken for processing the IO requests. The performance information of the data storing unit 243 contains information such as the IO count. Herein, the monitoring unit 103 represents an example of an "information obtaining unit".

The information storing unit 104 receives, from the setting unit 101, input of setting information such as the target response time along with the measurement period and the measurement interval for measuring the performance information. Then, the information storing unit 104 stores the obtained setting information. Moreover, the information storing unit 104 receives input of performance information from the data processing unit 242 and the data storing unit 243. The performance information contains the actually-measured response time, the other-IO-processing standby time, and the IO processing time. Then, the information storing unit 104 stores the obtained performance information. Meanwhile, the information storing unit 104 is implemented using, for example, the HDD 14 illustrated in FIG. 2.

The bandwidth managing unit 102 refers to the information stored in the information storing unit 104 and identifies the volumes 232 for which the target response time is set. In the following explanation, the volumes 232 for which the target response time is set are called "targeted volumes". On the other hand, the volumes 232 for which the target response time is not set are called "non-targeted volumes". Herein, each task provided from the task servers 4 is assigned with the volume 232. Thus, a targeted volume can be said to be the volume 232 that corresponds to a task for which the target response time is set. On the other hand, a non-targeted volume can be said to be the volume 232 that corresponds to a task for which the target response time is not set.

The bandwidth managing unit 102 selects one of the targeted volumes. Then, the bandwidth managing unit 102 obtains the actually-measured response time for the selected targeted volume from the information storing unit 104. Moreover, the bandwidth managing unit 102 obtains the target response time for the selected targeted volume from the information storing unit 104. Subsequently, the bandwidth managing unit 102 compares the actually-measured response time and the target response time of the selected targeted volume.

When the target response time is shorter than the actually-measured response time, the bandwidth managing unit 102 obtains the bandwidth of the selected targeted volume in the following manner. Herein, the bandwidth can also be expressed using the IO count.

The explanation about the response time is given with reference to FIG. 4. In FIG. 4, circles stored in the bandwidth limitation standby queue 251 and the IO standby queue 253 represent IO requests. Of those IO requests, the IO requests illustrated as circles with hatching represent the IO requests with respect to the targeted volumes; while the IO requests illustrated as white circles represent IO requests with respect to the non-targeted volumes.

Given below is the explanation about the response time of the volume 232. The response time is expressed using Equation (1) given below.

$$\text{Response time}=(\text{bandwidth limitation standby time})+(\text{other-IO-processing standby time})+(\text{IO processing time}) \quad (1)$$

The bandwidth limitation standby time represents the period of time that, once the IO requests are stored in the bandwidth limitation standby queue 251, goes on until bandwidth limitation is performed by the bandwidth limitation control unit 252 and the IO requests get stored in the IO standby queue 253. The bandwidth limitation standby time of a particular IO request decreases if the bandwidth of the volume 232 that processes the concerned IO request is expanded.

The other-IO-processing standby time represents the period of time that, once the IO requests are stored in the IO standby queue 253 by the bandwidth limitation control unit 252, goes on until the IO requests are output to the IO processing unit 254. When there is an increase in the total IO load, the total other-IO-processing standby time also increases. If the bandwidth of the volumes other than the targeted volumes is narrowed so as to reduce the total IO load, then the other-IO-processing standby time decreases.

The IO processing time represents the time taken by the IO processing unit 254 to process the IO requests obtained from the IO standby queue 253. The IO processing time is depended on the IO load of the task and the performance of the storage device 2, but is not affected by the changes in the bandwidth.

The bandwidth managing unit 102 obtains the bandwidth of the targeted volumes using the actually-measured response time representing the actually-measured performance information, so that the bandwidth limitation standby time becomes equal to a target-achieving bandwidth limitation standby time expressed in Equation (2) given below. The target-achieving bandwidth limitation standby time represents an example of a "first-type standby time". Moreover, the other-IO-processing standby time represents an example of a "second-type standby time"

$$\text{Target-achieving bandwidth limitation standby time}=(\text{target response time})-(\text{other-IO-processing standby time})-(\text{IO processing time}) \quad (2)$$

Figure 5:
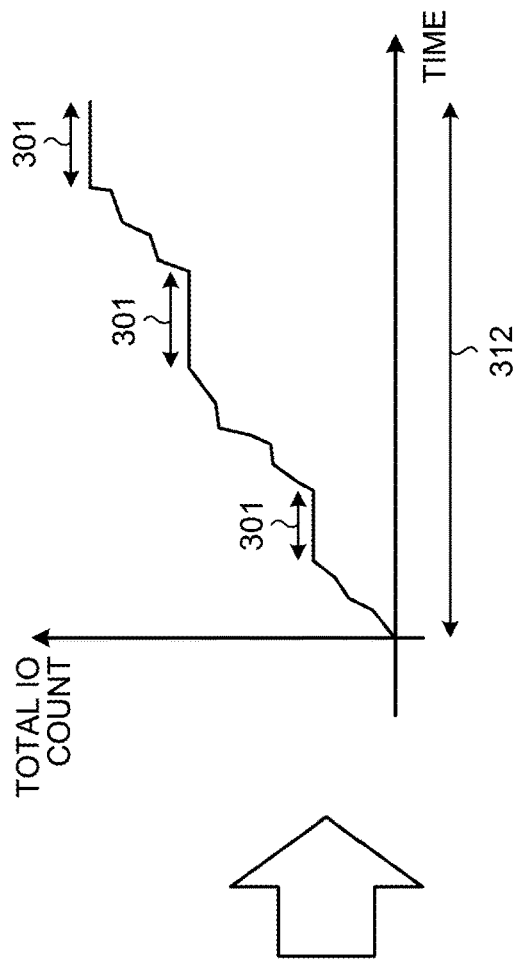
FIG. 5 is a diagram for explaining the relationship between bandwidth limitation, an input-output (IO) count, and a standby time.

Explained below with reference to FIG. 5 is the relationship between the bandwidth limitation, the IO count, and the standby time. FIG. 5 is a diagram for explaining the relationship between the bandwidth limitation, the IO count, and the standby time. In FIG. 5, with respect to a particular volume 232, the vertical axis represents the IO count and the horizontal axis represents the time.

In order to limit the bandwidth, a measurement period 312 is partitioned at a constant unit time 311. Then, as illustrated in the left-hand graph in FIG. 5, the bandwidth limitation control unit 252 passes, from the bandwidth limitation standby queue 251 to the IO standby queue 253, a specific IO count of such IO requests which are issued from the start of the unit time and which are issued with respect to the volumes 232 for which bandwidth limitation is instructed. Subsequently, in a remaining standby time 301 within the unit time, the bandwidth limitation control unit 252 waits for IO requests with respect to the volumes 232 for which bandwidth limitation is instructed while being stored in the bandwidth limitation standby queue 251. The bandwidth limitation control unit 252 repeatedly performs the bandwidth limitation operation for each unit time 311 within the measurement period 312, and performs bandwidth limitation as illustrated in the right-hand graph in FIG. 5.

Figure 6:
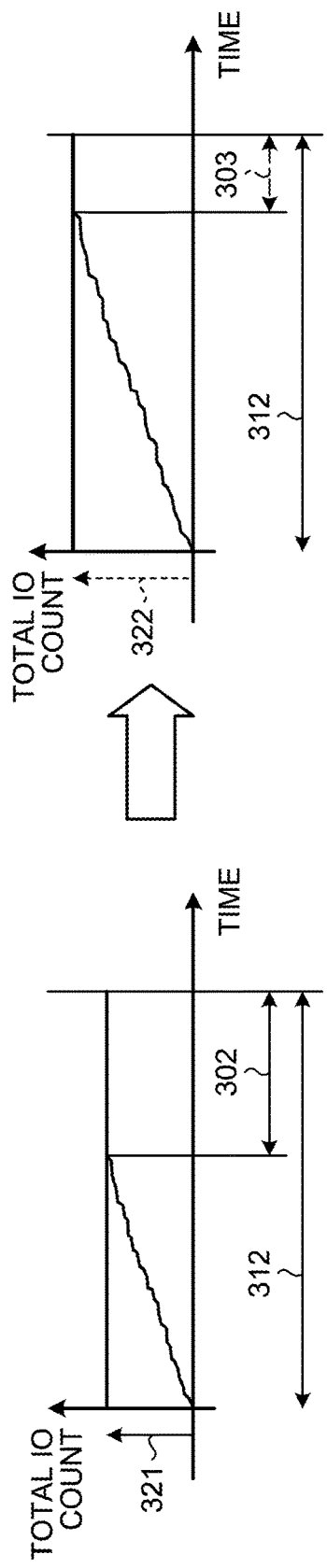
FIG. 6 is a diagram for explaining a target-achieving total standby time.

Explained below with reference to FIG. 6 is the calculation of the target-achieving total standby time representing the total standby time satisfying the target. FIG. 6 is a diagram for explaining the target-achieving total standby time. In FIG. 6, with respect to a particular volume 232, the vertical axis represents the IO count and the horizontal axis represents the time.

In the left-hand graph illustrated in FIG. 6, the time of passing of the IO requests illustrated in the right-hand side graph in FIG. 5 and the standby time are separately put together. That is, the time obtained by putting together the standby time 301 in the measurement period 312 represents a total standby time 302. Then, for example, when the bandwidth is expanded by the bandwidth limitation control unit 252; the total IO count changes from a total IO count 321 to a total IO count 322. As a result of the change in the total IO count from the total IO count 321 to the total IO count 322, the time for passing the IO requests becomes longer, and accordingly the total standby time 302 becomes shorter and changes to a total standby time 303.

Thus, in response to the expansion of the bandwidth, the IO count increases, and the standby time per IO decreases. As a result, the bandwidth managing unit 102 becomes able to improve the response time.

In that regard, using the target-achieving bandwidth limitation standby time calculated in Equation (2), the bandwidth managing unit 102 calculates the target-achieving total standby time that represents the total standby time satisfying the target and that is expressed using Equation (3) given below.

$$\text{Target-achieving total standby time} = (\text{target-achieving bandwidth limitation standby time}) \times (\text{IO count at target-achieving bandwidth}) \quad (3)$$

Figure 7:
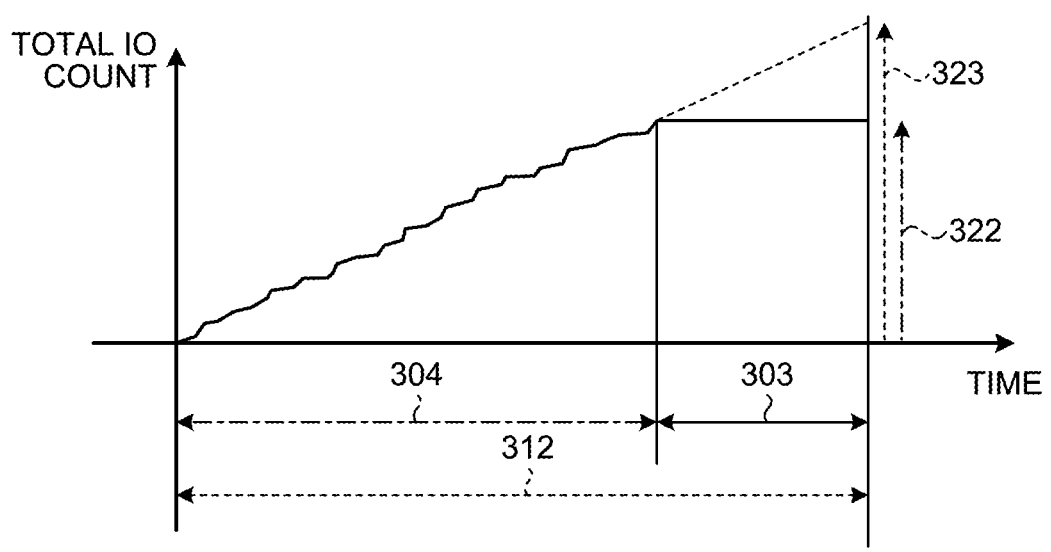
FIG. 7 is a diagram for explaining an unrestrained IO count.

Explained below with reference to FIG. 7 is an unrestrained IO count that represents the IO count in the case of no bandwidth limitation. FIG. 7 is a diagram for explaining the unrestrained IO count. In FIG. 7, with respect to a particular volume 232, the vertical axis represents the total IO count and the horizontal axis represents the time.

When the bandwidth limitation is applied, the measurement period 312 gets divided into a time 304, which is meant for passing the IO requests, and the total standby time 303. However, if there is no bandwidth limitation, there is no standby time too. Hence, during the total standby time 303 too, the total IO count goes on increasing at the same rate as in the time 304 that is meant for passing the IO requests. If the total IO count 322 increases at the same rate as in the time 304 meant for passing the IO requests, by extending without modification the graph of the time 304 meant for passing the IO requests, the unrestrained IO count becomes equal to a total IO count 323. Then, it can be said that the ratio of the unrestrained IO count to the IO count under the bandwidth limitation is equal to the ratio of the time 304, which is meant for passing the IO requests, to the total standby time 303; and is expressed using Equation (4) given below.

$$(\text{IO count under limitation}) \div (\text{unrestrained IO count}) = ((\text{measurement period}) - (\text{total standby time})) \div (\text{measurement period}) \quad (4)$$

Since the IO count under the bandwidth limitation is equal to the IO count at the time of measurement; the bandwidth managing unit 102 can obtain the IO count under the bandwidth limitation from the information storing unit 104. Moreover, the measurement period is a predetermined period of time, and the bandwidth managing unit 102 can obtain the measurement period. Furthermore, the total standby time represents the standby time at the time of measurement, and the bandwidth managing unit 102 can obtain the total standby time from the information storing unit 104. That is, using Equation (4), the bandwidth managing unit 102 can calculate the unrestrained IO count at the time of measurement.

Then, from Equation (3), the bandwidth managing unit 102 calculates the target-achieving total standby time, which represents the standby time that achieves the target, as given below in Equation (5).

$$\text{Target-achieving total standby time} = (\text{target-achieving bandwidth limitation standby time}) \times (\text{target-achieving IO count}) \quad (5)$$

Meanwhile, from Equation (4), the bandwidth managing unit 102 calculates the target-achieving IO count, which represents the IO count that achieves the target, as Equation (6) given below.

$$((\text{Target-achieving IO count}) \div (\text{unrestrained IO count})) = ((\text{measurement period}) - (\text{target-achieving total standby time})) \div (\text{measurement period}) \quad (6)$$

In Equations (5) and (6), the target-achieving total standby time and the target-achieving IO count are the unclear values. In that regard, using Equations (5) and (6), the bandwidth managing unit 102 can obtain the target-achieving total standby time and the target-achieving IO count.

Subsequently, the bandwidth managing unit 102 generates a setting command for bandwidth expansion or bandwidth reduction in such a way that the calculated target-achieving standby time and the target-achieving IO count are achieved. Then, the bandwidth managing unit 102 sends the generated setting command to the data processing unit 242.

Meanwhile, if there is a target-achieving volume that does not achieve the target even at the standby time of 0; then the bandwidth managing unit 102 generates, with respect to that target-achieving volume, a setting command for bandwidth expansion or bandwidth reduction in such a way that the IO count in the case of no bandwidth limitation is achieved. Then, the bandwidth managing unit 102 sends the generated setting command to the data processing unit 242.

The functions of the information storing unit 104 are implemented using, for example, the HDD 14 illustrated in FIG. 2. Moreover, the functions of the setting unit 101, the bandwidth managing unit 102, and the monitoring unit 103 are implemented using, for example, the CPU 13 and the memory 12 illustrated in FIG. 2. For example, the HDD 14 is used to store various computer programs meant for implementing the functions of the setting unit 101, the bandwidth managing unit 102, and the monitoring unit 103. The CPU 13 reads various computer programs from the HDD 14; loads, in the memory 12, the processes for implementing the functions of the setting unit 101, the bandwidth managing unit 102, and the monitoring unit 103; and executes the processes.

Figure 8:
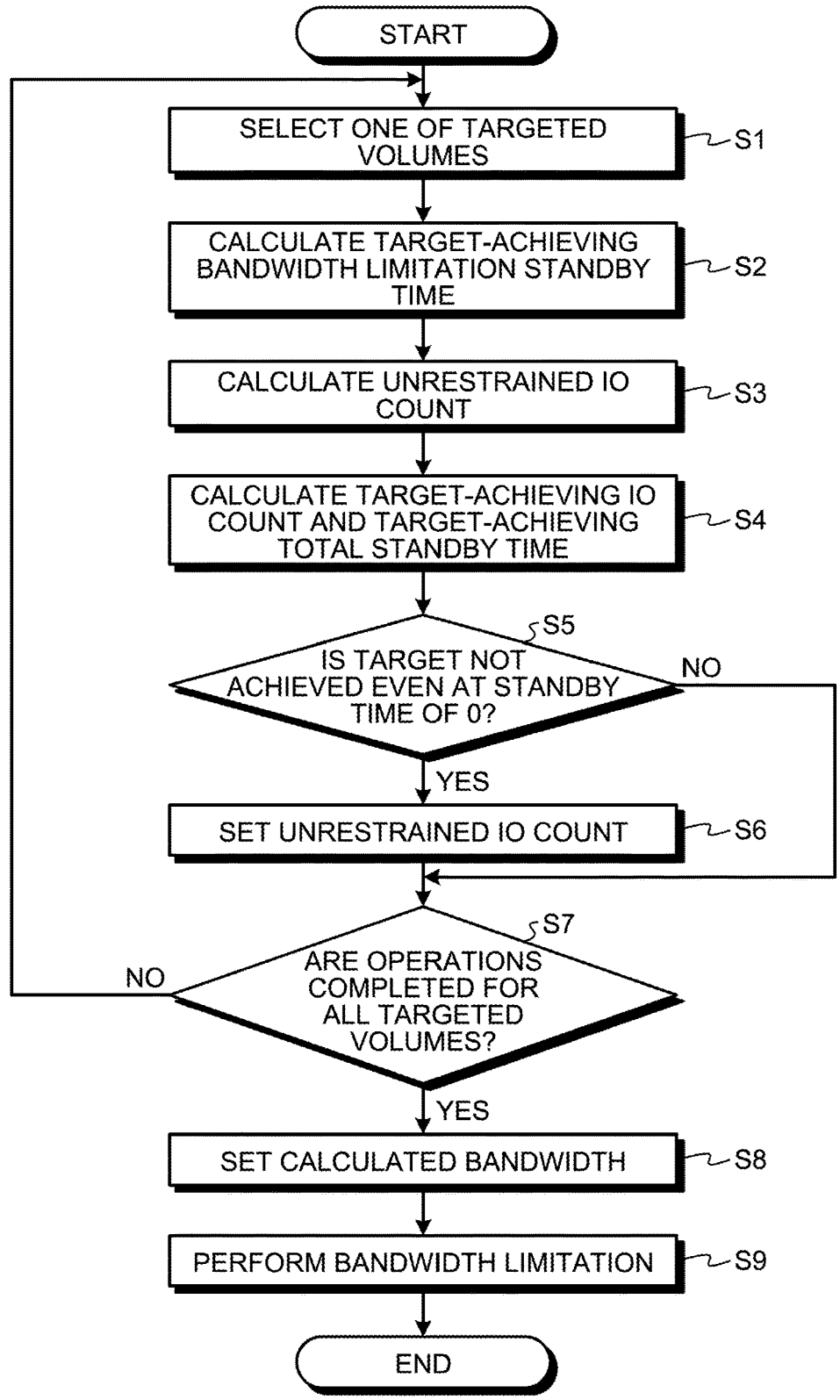
FIG. 8 is a flowchart for explaining the operations for bandwidth limitation as performed by the operations management server according to the first embodiment.

Explained below with reference to FIG. 8 is a flow of operations for bandwidth limitation as performed by the operations management server 1 according to the first embodiment. FIG. 8 is a flowchart for explaining the operations for bandwidth limitation as performed by the operations management server according to the first embodiment.

The bandwidth managing unit 102 identifies the targeted volumes by referring to the information stored in the information storing unit 104. Then, the bandwidth managing unit 102 selects one of the targeted volumes that have been identified (Step S1).

Subsequently, the bandwidth managing unit 102 obtains the target response time, the other-IO-processing standby time, and the IO processing time from the information storing unit 104. The bandwidth managing unit 102 uses the obtained information in Equation (2) and calculates the target-achieving bandwidth limitation standby time (Step S2).

Subsequently, the bandwidth managing unit 102 obtains the following from the information storing unit 104: the IO count under the bandwidth limitation; the measurement period; and the total standby time. The bandwidth managing unit 102 uses the obtained information in Equation (4) and calculates the unrestrained IO count (Step S3).

Then, the bandwidth managing unit 102 uses the calculated target-achieving bandwidth limitation standby time, the calculated unrestrained IO count, and the obtained measurement period in Equations (5) and (6); and calculates the target-achieving IO count and the target-achieving total standby time (Step S4).

Subsequently, the bandwidth managing unit 102 determines whether or not the target is not achieved by the selected target-achieving volume even at the standby time of 0 (Step S5). If the target is achieved (No at Step S5), the system control proceeds to Step S7.

On the other hand, if the target is not achieved (Yes at Step S5), then the bandwidth managing unit 102 sets the unrestrained IO count as the bandwidth of the selected target-achieving volume (Step S6).

Then, the bandwidth managing unit 102 determines whether or not the operations for deciding the bandwidth limitation are completed for all targeted volumes (Step S7) If there is a targeted volume for which the bandwidth limitation has not been decided (No at Step S7), then the system control returns to Step S1.

When the operations for deciding the bandwidth limitation are completed for all targeted volumes (Yes at Step S7), the bandwidth managing unit 102 notifies the data processing unit 242 of the storage device 2 about the decided bandwidth limitation for each volume and sets the calculated bandwidth in the storage device 2 (Step S8).

The data processing unit 242 refers to the notified bandwidth limitation and accordingly performs bandwidth limitation with respect to each targeted volume (Step S9).

As described above, the operations management server according to the first embodiment obtains the relational expression of the provided target response time and the bandwidth, and decides on the bandwidth of the volumes for which the target response time is set. As a result, the adjustment of the bandwidth satisfying the target value can be promptly done without having to adjust the bandwidth in a stepwise manner, thereby making it possible to adequately follow unexpected or rapid changes in the IO.

[b] Second Embodiment

Given below is the explanation of a second embodiment. The storage system according to the second embodiment differs from the first embodiment in the way that, when there is a targeted volume that does not achieve the target even at the standby time of 0, the bandwidth of non-targeted volumes is provided for use. The storage system 100 according to the second embodiment too has the configuration illustrated in FIGS. 1 to 3. In the following explanation, identical functions of the constituent elements to the functions according to the first embodiment are not explained again.

The bandwidth managing unit 102 obtains the bandwidth of the targeted volumes in an identical manner to the first embodiment. In the following explanation, the operation of calculating the targeted volume is called preceding operation. At the point of time of completion of the preceding operation, the bandwidth managing unit 102 determines whether or not there is any targeted volume that has not achieved the target. If all targeted volumes have achieved the target response time, then the bandwidth managing unit 102 ends the bandwidth control operation. However, if the bandwidth control operation is carried on without termination, then the bandwidth of the non-targeted volumes can be expanded within the range in which all targeted volumes achieve the target response time.

While on the other hand, if there is a targeted volume that has not achieved the target response time, the bandwidth managing unit 102 calculates the IO count with respect to each non-targeted volume. Meanwhile, regarding the targeted volumes for which bandwidth limitation is not performed, the bandwidth managing unit 102 calculates the IO count in an identical manner to the calculation for the non-targeted volumes.

Subsequently, the bandwidth managing unit 102 selects such a targeted volume for which the actually-measured response time is the farthest from the target response time.

Then, the bandwidth managing unit 102 obtains a target-achieving other-IO-processing standby time that represents the other-IO-processing standby time expressed using Equation (7) given below.

Target-achieving other-IO-processing standby time=
(target response time)−(IO processing time)−
(bandwidth limitation standby time)     (7)

In the case of performing calculation for a targeted volume that has not achieved the target, the bandwidth managing unit 102 sets the bandwidth limitation standby time to 0. Since the selected targeted volume has not achieved the target, the bandwidth managing unit 102 calculates the target-achieving other-IO-processing standby time with the bandwidth limitation standby time set to 0.

Subsequently, the bandwidth managing unit 102 calculates the total IO count of all of the volumes 232 in the following manner.

The other-IO-processing standby time for a particular volume 232 can be expressed using the M/M/1 model as given below in Equation (8).

$$T_w = \frac{\rho}{1-\rho} \times T_s \quad (8)$$
$$\rho = \lambda/\mu$$

Herein, Tw represents the other-IO-processing standby time. Moreover, Ts represents the IO processing time. The average of the IO processing times is assumed to represent the IO processing time (Ts). Furthermore, ρ represents the rate of utilization. Moreover, λ represents the total IO count, and represents the value obtained by adding the sum of the IO counts of all targeted volumes and the sum of the IO counts of all non-targeted volumes. Furthermore, μ represents a unit time processible count that is the number of IO requests processible per unit time in the storage device 2.

The bandwidth managing unit 102 can obtain the IO counts of the targeted volumes and the IO counts of the non-targeted volumes from the information storing unit 104. Then, the bandwidth managing unit 102 obtains the total IO count (λ) from the performance information stored in the information storing unit 104 from which the IO count of the targeted volumes and the IO count of the non-targeted volumes are obtained.

Moreover, the bandwidth managing unit 102 can obtain the IO processing time (Ts) and the IO processing standby time (Tw) from the information storing unit 104. Furthermore, the bandwidth managing unit 102 can obtain the actually-measured response time of each volume 232 from the information storing unit 104. The actually-measured response time is the sum of the IO processing time (Ts), the other-IO-processing standby time (Tw), and the bandwidth limitation standby time. If the bandwidth limitation standby time is zero, the actually-measured response time represents the sum of the IO processing time (Ts) and the other-IO-processing standby time (Tw).

The bandwidth managing unit 102 uses the IO processing standby time (Ts) and the other-IO-processing standby time (Tw) obtained from the information storing unit 104, uses the calculated total IO count (λ), uses Equation (8), and calculates the unit time processible count (μ) as expressed in Equation (9) given below.

$$\mu = \frac{T_w + T_s}{T_w} \times \lambda \quad (9)$$

Subsequently, the bandwidth managing unit 102 obtains a total IO count ($\lambda_1$), which achieves the target, using the M/M/1 model with respect to the target-achieving other-IO-processing standby time ($T_{w1}$) of the target setting volume, the unit time processible count ($\mu$) obtained in Equation (9), and the IO processing time ($T_s$) obtained in Equation (9). The total IO count ($\lambda_1$) is expressed using Equation (10) given below.

$$\lambda_1 = \frac{T_{w_1}}{T_{w_1} + T_{s_1}} \times \mu \qquad (10)$$

Herein, $Ts_1$ represents the average of the IO processing times of the volumes 232. Hence, if the IO counts of the targeted volumes are not changed but if the IO counts of the non-targeted volumes are changed, then the average $T_{s1}$ also changes. In that regard, the bandwidth managing unit 102 uses, as the average $T_{s1}$, the value obtained in Equation (11) given below.

$$T_{s_1} = \frac{\lambda_m \times T_m + (\lambda - \lambda_m)T_0}{\lambda} \qquad (11)$$

Herein, $\lambda_m$ represents the IO count of the targeted volume. Moreover, $T_m$ represents the IO processing time of the targeted volume. Furthermore, $T_o$ represents the IO processing time of the yet-untargeted volume.

Moreover, when the target has not been achieved by a plurality of targeted volumes, the bandwidth managing unit 102 uses the following values. That is, $T_m$ is assumed to be the average of the IO counts of the targeted volumes. Moreover, $T_o$ is set as the average of the IO processing times in the yet-untargeted volumes.

When there is a plurality of targeted volumes, there exists a plurality of other-IO-processing standby times ($T_{w1}$) to be targeted. Thus, when a plurality of targeted volumes is present, at the point of time when a new bandwidth of the targeted volumes is decided, the bandwidth managing unit 102 selects such other-IO-processing standby time in which the targeted volume that is farthest from the target response time satisfies the target response time. Then, the bandwidth managing unit 102 sets the selected other-IO-processing standby time as the other-IO-processing standby time ($T_{w1}$) that is targeted.

Then, as given below in Equation (12), the bandwidth managing unit 102 subtracts, from the total IO count ($\lambda_1$) obtained using Equation (9), the total of the IO counts of the targeted volumes as calculated in the bandwidth limitation operation explained in the first embodiment; and calculates the total of the IO counts of the yet-untargeted volumes.

Total of IO counts of yet-untargeted volumes=($\lambda_1$)−
(total of IO counts of targeted volumes) (12)

Thereafter, if there is a plurality of yet-untargeted volumes, then the bandwidth managing unit 102 allots the calculated IO count of the yet-untargeted volumes to each yet-untargeted volume. More particularly, the bandwidth managing unit 102 allots the calculated total IO count in the proportion of the IO count prior to the application of bandwidth limitation to the corresponding yet-untargeted volume, and assigns the allotted IO count to each yet-untargeted volume.

Figure 9:
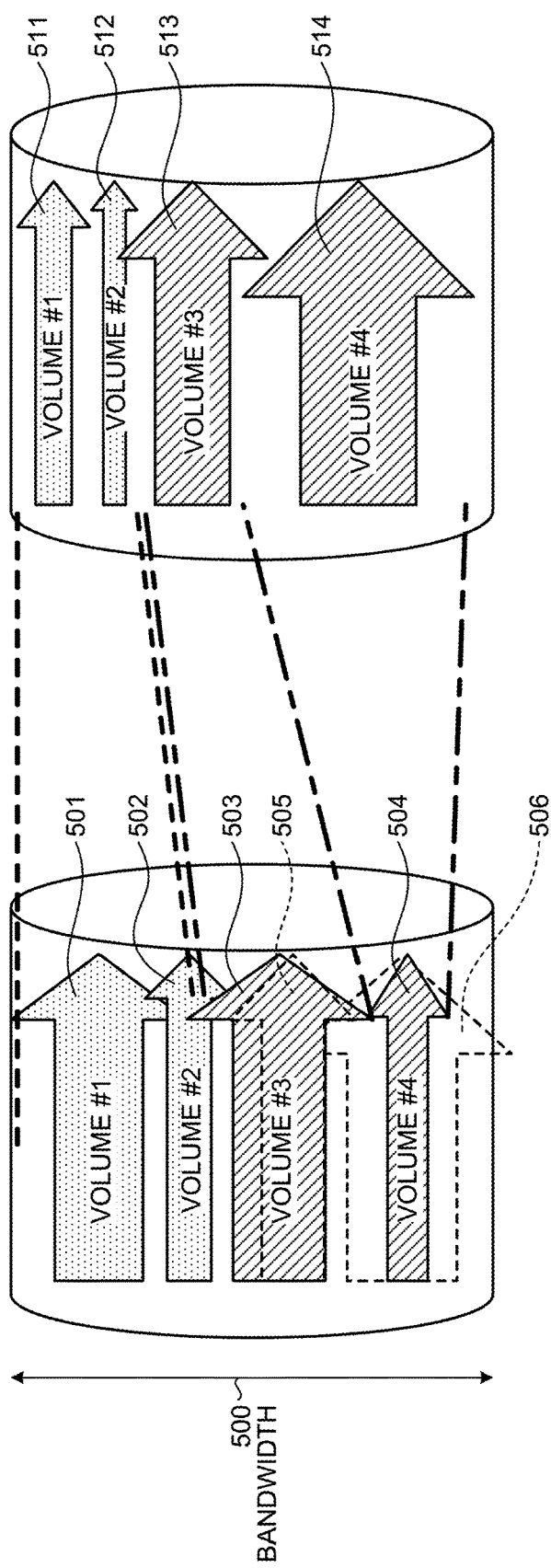
FIG. 9 is a diagram illustrating the outline of the bandwidth control performed by the operations management server according to the second embodiment.

With reference to FIG. 9, explained below is the entire bandwidth control performed by the operations management server 1 according to the second embodiment. FIG. 9 is a diagram illustrating the outline of the bandwidth control performed by the operations management server 1 according to the second embodiment.

In FIG. 9, the state illustrated on the left-hand side represents the state prior to the implementation of the bandwidth control operation. A bandwidth 500 represents the overall bandwidth of the storage device 2. Herein, the explanation is given for a case in which there are four volumes, namely, volumes #1 to #4. Each arrow represents the bandwidth assigned to one of the volumes #1 to #4. The volumes #1 and #2 are assumed to be non-targeted volumes, and the volumes #3 and #4 are assumed to be targeted volumes.

In the state illustrated on the left-hand side, no limitation is applied on a bandwidth 501 of the volume #1 and a bandwidth 502 of the volume #2. The volume #3 is assigned with a bandwidth 503. Moreover, a bandwidth 505 is the bandwidth at which the target is achieved by the volume #3. That is, in the state illustrated on the left-hand side, the volume #3 has already achieved the target response time.

The volume #4 has a bandwidth 504 assigned thereto. Moreover, a bandwidth 506 is the bandwidth at which the target is achieved by the volume #4. That is, in the state illustrated on the left-hand side, the volume #4 has not yet achieved the target response time.

In that regard, with the bandwidth of the volumes #3 and #4 serving as the lower limit of the bandwidth for satisfying the target, the bandwidth managing unit 102 obtains the target-achieving IO count. In that case, the bandwidth managing unit 102 treats the bandwidth of the volume #3 as a bandwidth 513, and treats the bandwidth of the volume #4 as a bandwidth 514. Moreover, the bandwidth managing unit 102 sets the remaining bandwidth, which is formed by excluding the bandwidths 513 and 514 from the bandwidth 500, as the bandwidth of the volumes #1 and #2 representing the non-targeted volumes. Then, the bandwidth managing unit 102 divides the remaining bandwidth proportionally at the ratio of the bandwidths in the left-hand side state of the volumes #1 and #2 representing the non-targeted volumes. As a result, the bandwidth of the volume #1 is reduced from the bandwidth 501 to a bandwidth 511. Moreover, the bandwidth of the volume #2 is reduced from the bandwidth 502 to a bandwidth 512.

Figure 10:
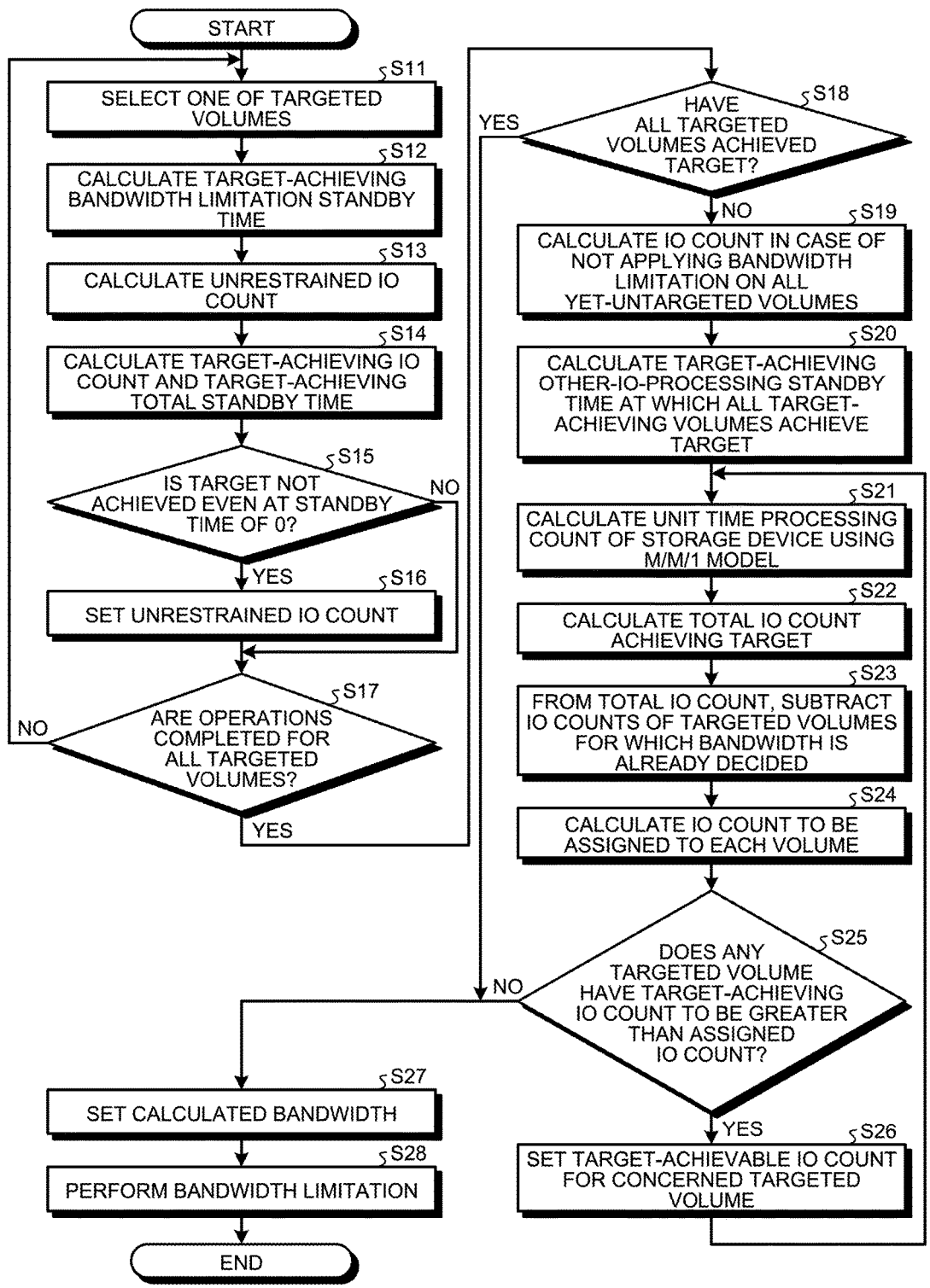
FIG. 10 is a flowchart for explaining the operations for bandwidth limitation as performed by the operations management server according to the second embodiment.

Explained below with reference to FIG. 10 is a flow of operations for bandwidth limitation as performed by the operations management server 1 according to the second embodiment. FIG. 10 is a flowchart for explaining the operations for bandwidth limitation as performed by the operations management server according to the second embodiment.

The bandwidth managing unit 102 identifies the targeted volumes by referring to the information stored in the information storing unit 104. Then, the bandwidth managing unit 102 selects one of the targeted volumes that have been identified (Step S11).

Then, the bandwidth managing unit 102 obtains the target response time, the other-IO-processing standby time, and the IO processing time from the information storing unit 104. The bandwidth managing unit 102 uses the obtained information in Equation (2) and calculates the target-achieving bandwidth limitation standby time (Step S12).

Subsequently, the bandwidth managing unit 102 obtains the following from the information storing unit 104: the IO count under the bandwidth limitation; the measurement period; and the total standby time. The bandwidth managing unit 102 uses the obtained information in Equation (4) and calculates the unrestrained IO count (Step S13).

Then, the bandwidth managing unit 102 uses the calculated target-achieving bandwidth limitation standby time, the calculated unrestrained IO count, and the obtained measurement period in Equations (5) and (6); and calculates the target-achieving IO count and the target-achieving total standby time (Step S14).

Subsequently, the bandwidth managing unit 102 determines whether or not by the selected target-achieving volume even at the standby time of 0 (Step S15). If the target is achieved (No at Step S15), the system control proceeds to Step S17.

On the other hand, if the target is not achieved (Yes at Step S15), then the bandwidth managing unit 102 sets the unrestrained IO count as the bandwidth of the selected target-achieving volume (Step S16).

Then, the bandwidth managing unit 102 determines whether or not the operations for deciding the bandwidth limitation are completed for all targeted volumes (Step S17). If there is a targeted volume for which the bandwidth limitation has not be decided yet (No at Step S17), then the system control returns to Step S11. Herein, the operations from Step S11 to Step S17 represent the preceding operation.

When the operations for deciding the bandwidth limitation are completed for all targeted volumes (Yes at Step S17), the bandwidth managing unit 102 determines whether or not all targeted volumes have achieved the target (Step S18). If all targeted volumes have achieved the target (Yes at Step S18), the system control proceeds to Step S27.

On the other hand, if any targeted volume has not yet achieved the target (No at Step S18), then the bandwidth managing unit 102 calculates the IO count in the case of not applying the bandwidth limitation on all yet-untargeted volumes (Step S19).

Subsequently, the bandwidth managing unit 102 selects such a targeted volume for which the actually-measured response time is the farthest from the target response time. The bandwidth managing unit 102 uses the target response time of the selected targeted volume in Equation (7) and calculates the target-achieving other-IO-processing standby time at which all target-achieving volumes achieve the target (Step S20).

Then, the bandwidth managing unit 102 uses the IO processing time, the other-IO-processing standby time, and the total IO count in the M/M/1 model expressed in Equation (8); and calculates the unit time processible count of the storage device 2 as expressed in Equation (9) (Step S21)

Subsequently, the bandwidth managing unit 102 uses the target-achieving other-IO-processing standby time, the unit time processible count, and the IO processing time of the targeted volumes in the M/M/1 model; and calculates the total IO count achieving the target as expressed in Equation (10) (Step S22).

Then, the bandwidth managing unit 102 subtracts, from the total IO count, the IO counts of the targeted volumes for which the bandwidth is already decided (Step S23), and calculates the IO count that is assignable to the remaining volumes 232.

Subsequently, the bandwidth managing unit 102 assigns the IO count, which is assignable to the remaining volumes 232, to the remaining volumes 232 according to the pre-change bandwidth; and calculates the IO count to be assigned to each volume 232 (Step S24).

Then, the bandwidth managing unit 102 determines whether or not there any targeted volume has the target-achieving IO count to be greater than the assigned IO count (Step S25).

If there is a targeted volume having the target-achieving IO count to be greater than the assigned IO count (Yes at Step S25), then the bandwidth managing unit 102 sets a target-achievable IO count for the concerned targeted volume (Step S26). Then, the system control returns to Step S21.

On the other hand, if there is no a targeted volume having the target-achieving IO count to be greater than the assigned IO count (No at Step S25), then the system control returns to Step S27.

The bandwidth managing unit 102 notifies the data processing unit 242 of the storage device 2 about the bandwidth limitation decided for the volumes 232, and sets the calculated bandwidths in the storage device 2 (Step S27).

The data processing unit 242 performs bandwidth limitation with respect to each targeted volume according to the notified bandwidth limitation (Step S28).

Given below is the explanation of a specific example of bandwidth limitation. For example, the explanation is given for a case in which there are tasks A and B that use targeted volumes and there are tasks X and Y that use non-targeted volumes. Moreover, the following explanation is given for a case in which the IO count is controlled in the state in which the preceding operation has completed and the IO count of each targeted volume has been decided.

The targeted volume used by the task A has the actually-measured IO count of 50, and has not been subjected to bandwidth limitation and is yet to achieve the target. Moreover, the targeted volume used by the task B has the actually-measured IO count of 50, and has not been subjected to bandwidth limitation and has 40 as the IO count that achieves the target response time. That is, the targeted volume used by the task B is in a controllable state. The non-targeted volume used by the task X has the actually-measured IO count of 150, and has not been subjected to bandwidth limitation. The non-targeted volume used by the task Y has the actually-measured IO count of 50, and is subjected to bandwidth limitation. Moreover, the non-targeted volume used by the task Y has the actually-measured IO count of 50 in the case of not being subjected to bandwidth limitation. In such a state, the bandwidth managing unit 102 performs the bandwidth control operation subsequent to the preceding operation.

The bandwidth managing unit 102 uses the performance information and the M/M/1 model representing the measurement result in the storage device 2, and calculates the total IO count at which all targeted volumes satisfy the target. Herein, the explanation is given for a case in which the bandwidth managing unit 102 calculates the total IO count of 200 at which all targeted volumes satisfy the target.

Subsequently, the bandwidth managing unit 102 assigns the calculated total IO count to each volume 232. More particularly, the bandwidth managing unit 102 calculates the ratio of the remaining IO count, which is obtained by excluding the IO count for the task A that has not achieved the target, to the total of the IO counts of the volumes 232 used by the tasks B, X, and Y. In this case, the bandwidth managing unit 102 calculates the ratio as $(200-50)/(50+150+100) \cong 0.5$.

Then, the bandwidth managing unit 102 compares the IO count enabling achieving the target response time of the targeted volume used by the task B with the IO count in the case in which the IO counts are assigned at the calculated ratio. Then, the bandwidth managing unit 102 sets the higher IO count as the IO count of the targeted volume used by the task B. In this case, the IO count of 40 is the IO count enabling achieving the target response time of the targeted volume used by the task B. Moreover, regarding the targeted volume used by the task B, in the case of assigning the IO count at the calculated ratio, the IO count becomes equal to 25. Thus, the bandwidth managing unit 102 sets the IO count of 40 as the IO count of the targeted volume used by the task B.

However, unlike in this case, if the IO count assigned at the calculated ratio to the targeted volume used by the task B is the greater IO count, then the bandwidth managing unit 102 assigns the IO count to the tasks X and Y at the calculated ratio and decides the bandwidth of each volume 232.

Subsequently, in the case in which the IO count of the targeted volume used by the task A is set to 50 and the IO count of the targeted volume used by the task B is set to 40, the bandwidth managing unit 102 recalculates the IO count at which all targeted volumes can achieve the target. In this case too, the bandwidth managing unit 102 calculates the total IO count using the performance information and the M/M/1 model representing the measurement result in the storage device 2. Herein, the explanation is given for a case in which the bandwidth managing unit 102 calculates the IO count of 190 as the total IO count at which all targeted volumes satisfy the target.

The bandwidth managing unit 102 obtains the ratio of the remaining IO count, which is obtained by subtracting the IO count of the targeted volumes used by the tasks A and B from the calculated total IO count, to the total IO count of the non-targeted volumes used by the tasks X and Y. In this case, the bandwidth managing unit 102 calculates the ratio as (190−50−40)/250=0.4.

Subsequently, the bandwidth managing unit 102 multiplies, to the calculated ratio, the IO count in the case of not applying bandwidth limitation on the non-targeted volumes, and obtains the IO count of the non-targeted volumes used by the tasks X and Y. In that case, as the IO count of the non-targeted volume used by the task X, the bandwidth managing unit 102 obtains 150×0.4=60. Moreover, as the IO count of the non-targeted volume used by the task Y, the bandwidth managing unit 102 obtains 100×0.4=40.

The bandwidth managing unit 102 sets, in the targeted volume used by the task A, the bandwidth corresponding to the IO count of 50. Similarly, the bandwidth managing unit 102 sets, in the targeted volume used by the task B, the bandwidth corresponding to the IO count of 40. Moreover, the bandwidth managing unit 102 sets, in the targeted volume used by the task X, the bandwidth corresponding to the IO count of 60. Similarly, the bandwidth managing unit 102 sets, in the targeted volume used by the task Y, the bandwidth corresponding to the IO count of 40.

In the explanation given above, the remaining IO count, which is obtained by excluding from the total IO count from the IO count of the targeted volumes for which the bandwidth has been decided, is assigned to the remaining volumes 232 according to the ratio of the IO count in the case of not applying bandwidth limitation on the remaining volumes 232. However, some other method of allocating the remaining IO count can also be implemented. For example, the remaining IO count can be equally assigned among the remaining volumes.

As described above, in the operation management server according to the second embodiment, when the target is not achieved with the bandwidth obtained in the preceding operation; such a bandwidth is obtained at which, within the range in which the targeted volumes satisfy the target response time, the response time of the non-targeted volumes is at the shortest. As a result, it becomes possible to enhance the possibility that the targeted volumes satisfy the target response time. In this case too, the adjustment of the bandwidth satisfying the target value can be promptly done without having to adjust the bandwidth in a stepwise manner.

Meanwhile, in the embodiments described above, the explanation is given for a method of deciding the bandwidth using the IO count as the performance information. However, as long as there is information using which the bandwidth can be obtained, the information is not limited to the IO count. Alternatively, for example, the bandwidth can be decided using the throughput.

According to an aspect of the storage management device, the performance adjustment method, and the computer-readable recording medium disclosed herein, the bandwidth can be adjustment in an expeditious manner.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A storage management device comprising:
a processor configured to:
obtain performance information of each of a plurality of volumes included in a storage device;
obtain a performance target value for each of one or more targeted volumes from among the plurality of volumes;
obtain, based on the performance information obtained and based on a first-type standby time that is attributed to bandwidth limitation of IO requests with respect to the targeted volumes, the bandwidth limitation achieving the obtained performance target value and bandwidth for the targeted volumes that achieve the obtained performance target value; and
perform bandwidth limitation to change the bandwidth of the targeted volumes to the obtained bandwidth, wherein the IO requests are subjected to the bandwidth limitation then waiting for a second-type standby time until being processed.

2. The storage management device according to claim 1, wherein
the processor configured to obtain the second-type standby time and an IO processing time, which represents time taken for processing of the IO requests,
obtain a target response time,
calculate the first-type standby time based on the second-type standby time, the IO processing time, and the target response time,
obtain total standby time within a measurement period of the IO requests based on the first-type standby time, and
obtain, based on relationship of the total standby time with number of times for which the IO requests are processed within the measurement period, bandwidth of the targeted volumes that achieve the performance target value.

3. The storage management device according to claim 2, wherein, the processor configured to, even when a particular targeted volume uses maximum bandwidth of usable bandwidth, if the particular targeted volume does not achieve the performance target value, obtain, based on the second-type standby time and based on the performance information, bandwidth for non-targeted volumes, from among the plurality of volumes, for which the performance target value is not set, and perform bandwidth limitation to change the bandwidth of the non-targeted volumes to the obtained bandwidth, so as to ensure that the particular targeted volume achieves the performance target value.

4. A performance adjustment method comprising:

first obtaining performance information of each of a plurality of volumes included in a storage device;

second obtaining a performance target value for each of one or more targeted volumes from among the plurality of volumes;

third obtaining, based on the performance information obtained and based on a first-type standby time that is attributed to bandwidth limitation of IO requests with respect to the targeted volumes, the bandwidth limitation achieving the obtained performance target value and bandwidth for the targeted volumes that achieve the obtained performance target value; and performing bandwidth limitation to change the bandwidth of the targeted volumes to the obtained bandwidth, wherein the IO requests are subjected to the bandwidth limitation then waiting for a second-type standby time until being processed.

5. The performance adjustment method according to claim 4, wherein, the first obtaining includes obtaining the second-type standby time and an IO processing time, which represents time taken for processing of the IO requests, the second obtaining includes obtaining a target response time, the third obtaining includes calculating the first-type standby time based on the second-type standby time, the IO processing time, and the target response time, obtaining total standby time within a measurement period of the IO requests based on the first-type standby time, and obtaining, based on relationship of the total standby time with number of times for which the IO requests are processed within the measurement period, bandwidth of the targeted volumes that achieve the performance target value.

6. The performance adjustment method according to claim 5, wherein, the third obtaining, even when a particular targeted volume uses maximum bandwidth of usable bandwidth, if the particular targeted volume does not achieve the performance target value, includes obtaining, based on the second-type standby time taken until the IO requests subjected to the bandwidth limitation are processed and based on the performance information, bandwidth for non-targeted volumes, from among the plurality of volumes, for which the performance target value is not set, and performing bandwidth limitation to change the bandwidth of the non-targeted volumes to the obtained bandwidth, so as to ensure that the particular targeted volume achieves the performance target value.

7. A non-transitory computer-readable recording medium having stored therein a performance adjustment program that causes a computer to execute a process comprising:

first obtaining performance information of each of a plurality of volumes included in a storage device;

second obtaining a performance target value for each of one or more targeted volumes from among the plurality of volumes;

third obtaining, based on the performance information obtained and based on a first-type standby time that is attributed to bandwidth limitation of IO requests with respect to the targeted volumes, the bandwidth limitation achieving the obtained performance target value and bandwidth for the targeted volumes that achieve the obtained performance target value; and performing bandwidth limitation to change bandwidth of the targeted volumes to the obtained bandwidth, wherein the IO requests are subjected to the bandwidth limitation then waiting for a second-type standby time until being processed.

8. The non-transitory computer-readable recording medium according to claim 7, wherein, the first obtaining includes obtaining the second-type standby time and an IO processing time, which represents time taken for processing of the I requests, the second obtaining includes obtaining a target response time, the third obtaining includes calculating the first-type standby time based on the second-type standby time, the IO processing time, and the target response time, obtaining total standby time within a measurement period of the IO requests based on the first-type standby time, and obtaining, based on relationship of the total standby time with number of times for which the IO requests are processed within the measurement period, bandwidth of the targeted volumes that achieve the performance target value.

9. The non-transitory computer-readable recording medium according to claim 8, wherein, the third obtaining, even when a particular targeted volume uses maximum bandwidth of usable bandwidth, if the particular targeted volume does not achieve the performance target value, includes obtaining, based on the second-type standby time taken until the IO requests subjected to the bandwidth limitation are processed and based on the performance information, bandwidth for non-targeted volumes, from among the plurality of volumes, for which the performance target value is not set, and performing bandwidth limitation to change the bandwidth of the non-targeted volumes to the obtained bandwidth, so as to ensure that the particular targeted volume achieves the performance target value.

* * * * *